United States Patent
Rohrich et al.

(10) Patent No.: US 7,943,045 B2
(45) Date of Patent: May 17, 2011

(54) REACTOR WITH A THERMAL GRADIENT CONTROLLED FOR THE PRODUCTION OF PURE HYDROGEN

(75) Inventors: Klaus Rohrich, Divonne-les-Bains (FR); Harald Wirth, Farges (FR); Nils Kongmark, Ferney-Voltaire (FR)

(73) Assignee: H2 Power Systems Ltd., Dublin (IE)

( * ) Notice: Subject to any disclaimer, the term of this patent is extended or adjusted under 35 U.S.C. 154(b) by 214 days.

(21) Appl. No.: 12/304,681

(22) PCT Filed: Jun. 14, 2007

(86) PCT No.: PCT/EP2007/005236
§ 371 (c)(1),
(2), (4) Date: Dec. 12, 2008

(87) PCT Pub. No.: WO2007/144166
PCT Pub. Date: Dec. 21, 2007

(65) Prior Publication Data
US 2009/0232716 A1    Sep. 17, 2009

(30) Foreign Application Priority Data
Jun. 15, 2006 (FR) ..................................... 06 05309

(51) Int. Cl.
*B01D 63/06* (2006.01)
*B01D 53/22* (2006.01)
*B01D 61/00* (2006.01)

(52) U.S. Cl. ......... 210/321.64; 210/321.87; 210/321.88; 210/321.89; 96/4; 96/10

(58) Field of Classification Search .................. None
See application file for complete search history.

(56) References Cited

U.S. PATENT DOCUMENTS
4,233,127 A * 11/1980 Monahan .................. 204/157.5
(Continued)

FOREIGN PATENT DOCUMENTS
FR    2366216    4/1978
(Continued)

OTHER PUBLICATIONS

Steinfeld et al., "A Solar Chemical Reactor for Co-production of Zinc and Synthesis Gas", Energy, vol. 23, No. 10, pp. 803-814, 1998.
Steinfeld and Palumbo, "Solar Thermochemical Process Technology", Encyclopedia of Physical Science & Technology, R.A. Meyers Ed., Academic Press, vol. 15, pp. 237-256, 2001.

*Primary Examiner* — Krishnan S Menon
(74) *Attorney, Agent, or Firm* — Edwards Angell Palmer & Dodge LLP; Barry Kramer; Gabriel J. McCool

(57) ABSTRACT

A device for the thermal separation of water into hydrogen and oxygen, including a closed reaction chamber (1) containing water and, in said reaction chamber: —a heating system including one or several heat source elements (4,11), —one or several membranes (3), essentially impermeable to gas, to permit the selective passage of oxygen, —one or several membranes (2), essentially impermeable to gas, to permit the selective passage of hydrogen and —a mechanism (5) to permit the passage of water into said reaction chamber. According to the invention, —said heat source(s) (4, 11) is(are) placed in the water inside said reaction chamber (1), and, —said selective membranes (3) for oxygen are placed in said zones at high temperatures, —said selective membranes (2) for hydrogen are placed in said zones at lower temperatures. Preferably, the heating system is comprised of one or several concentrators (8, 9) of solar rays focusing the rays toward the inside of the reactor.

10 Claims, 3 Drawing Sheets

U.S. PATENT DOCUMENTS

| | | | |
|---|---|---|---|
| 4,254,086 A * | 3/1981 | Sanders | 422/187 |
| 4,332,775 A * | 6/1982 | Genequand et al. | 422/112 |
| 4,696,809 A * | 9/1987 | Vialaron et al. | 423/579 |
| 6,521,205 B1 * | 2/2003 | Beck | 423/658.2 |
| 2004/0050801 A1 | 3/2004 | Lee et al. | |
| 2006/0048808 A1 * | 3/2006 | Ruckman et al. | 136/206 |
| 2007/0269687 A1 | 11/2007 | Kongmark et al. | |

FOREIGN PATENT DOCUMENTS

| | | |
|---|---|---|
| FR | 2839713 | 11/2003 |
| GB | 1532403 A * | 11/1978 |
| WO | WO 03/097524 | 11/2003 |
| WO | WO 2006/064311 | 6/2006 |

* cited by examiner

REACTOR WITH A THERMAL GRADIENT CONTROLLED FOR THE PRODUCTION OF PURE HYDROGEN

RELATED APPLICATIONS/PATENTS AND INCORPORATION BY REFERENCE

This application is a National Stage Application filed under 35 U.S.C. §371 based on International Application No. PCT/EP2007/005236, filed Jun. 14, 2007, which claims priority to French Patent Application Number 0605309, filed Jun. 15, 2006, the entire contents each of which are incorporated herein by reference.

The foregoing applications, and all documents cited therein and all documents cited or referenced therein, and all documents cited or referenced herein, including any U.S. or foreign patents or published patent applications, International patent applications, as well as, any non-patent literature references and any manufacturer's instructions, are hereby expressly incorporated herein by reference.

BACKGROUND OF THE INVENTION

Hydrogen is the energy vector of the future, and many developments are in progress in the domain of fuel cells, hydrogen combustion engines and related technologies. However, the economic and ecological costs of the manufacturing, transport and the storage of hydrogen are the obstacles to a rapid change of an economy based on fossil fuels toward an economy based on hydrogen. Hydrogen production by thermal dissociation of water in a membrane reactor, in the waning stage by using solar energy, is not only neutral for the environment, but it may also provide a potentially high efficiency.

SUMMARY OF THE INVENTION

The proposed device is based on the thermal dissociation of water in a membrane reactor. It is optimised, in light of the heat and mass transfers, for a simultaneous and stoichiometric extraction of the oxygen and hydrogen [1]. Autonomous, with a small or medium size for the production of hydrogen, the device will help reduce the need for the transport and storage of hydrogen. Accordingly, it facilitates the introduction of hydrogen as an energy vector, generating significant economic gains.

Hydrogen produced by the device is pure, the sole contaminant being water. It can be conducted directly to a fuel cell, and thus be used for the co-production of heat and electricity for household uses or in small, decentralised units of production. The use of the device for mobile applications is also conceivable, in very compact, integrated versions in cars equipped with fuel cells.

The recent trend in the materials sector, and particularly the development of new types of membranes, have enabled the manufacture of devices that are economically viable and long lasting, such as this device.

The principles of the hydrogen-producing devices based on the dissociation of water at high temperatures and on the separation of gases by membranes are proposed in several publications and patents, such as those of Fally [2] and [3], Kogan [4], Seitzer [5] and [6], and Lee et al. [7].

The principal problems encountered in the hydrogen generators based on the thermal dissociation of water reside in the fact that, without additional uniform adjustments, hydrogen is present only in the high temperature zone where the water is at least partially dissociated. Hydrogen is extracted either by placing the membranes in the hot zones, or by soaking the dissociated vapour to prevent recombination. The hydrogen-selective membranes actually available do not have very high temperatures in the dissociation zone, and the soaking process consumes a great deal of energy. In both cases, these devices have a very restricted lifetime, or a restricted efficiency.

These problems can be avoided by separating the oxygen from the gas mixture in the hot zone, then extracting the remaining vapour from it, which is enriched with hydrogen and can be separated in various ways. However, the gas mixture extracted carries away part of the reactor energy and renders the process counter-productive. Extracting the hydrogen closer to the hot zone and not extracting the ballast vapour would be more effective. Fally [3] aimed in this direction by positioning the hydrogen-selective membranes exiting from the reactor chamber.

The hydrogen-selective membranes that function efficiently do so at temperatures that are well below the water dissociation temperature. In these temperature ranges, the membranes that have been developed even have catalytic effects, thus accelerating the transfer of hydrogen [8].

This invention discloses a holistic approach to the thermal dissociation of water and the separation of hydrogen, taking into account both the material constraints and the need of high efficiency. A temperature profile, optimised with respect to the characteristics of the various materials of the components, is thus implemented in the selection of a specific geometry, by the dimensioning of the device, and by the positioning of its components.

This invention pertains to a reactor chamber filled with water (or vapour; in what follows, "water" also represents the vapour aggregation state) inside of which all the functional components are placed.

The heat source(s) are placed in the water inside the reactor chamber, with sufficient power to heat the water in their proximity up to temperatures where the latter is dissociated, at least partially. A significant dissociation of the water begins at temperatures around 2000 K for approximately one percent of the existing molecules. The walls of the reactor chamber are chilled. There is a temperature gradient between the hot heat sources and the reactor chamber, which remains chilled.

Oxygen-selective membranes are placed close to the heat sources in the zone where the water is dissociated. They are used to extract the oxygen in this initial dissociation zone. In addition, they serve as a shield to protect the other components of the direct thermal radiation coming from the heat sources.

Hydrogen-selective membranes are placed in the coldest zones close to the walls of the reactor chamber. Chilling controls the temperature of these walls. The distance between the hydrogen-selective membranes and the dissociation zone is a function of the materials used in the membranes, according to the specific conditions of operability of the assembly.

The membranes are produced in such a manner that the gases extracted can be pumped or flushed out by using a neutral carrier gas. Tubular components, whose membranes form at least part of the walls in which they are integrated, are possible choices. The hydrogen and oxygen are extracted in the same ratio as that in which they are found in the water molecule. The extraction is controlled by the pump power or by the flushing speed. In order to maintain constant operating conditions, a corresponding quantity of water is injected by the reactor walls.

With this arrangement, the highest temperature zone becomes enriched with hydrogen, and an exchange of this hydrogen with the lowest temperature zone is developed to compensate the difference in concentration. The principal advantage of such an arrangement is the free flowing of the gases, while offering the possibility of a simple geometric concentration, facilitating the fabrication of the components.

The efficiency of the device is determined by the quantity of gases extracted with respect to the power implemented to heat the water and to chill the device. The quantity of gases extracted itself depends on the quantity of hydrogen and oxygen available and thus to the degree of water dissociation.

To improve the efficiency of the device, the oxygen-selective membranes are arranged around the heat source(s) in such a way that they reduce the heat flux from the heat source(s) toward the zone beyond the high temperatures. The result of such an arrangement is a balancing of the temperature in the zone between a heating zone and the oxygen-selective membranes that are all nearby. The heat source can work with a lower power and the dissociation zone of the water is more widespread.

Additional radiation shields, being permeable for hydrogen, may be placed between the higher temperature zones and the lower temperature zones to increase the effect already created by the oxygen-selective membranes.

DETAILED DESCRIPTION

Figure 1:
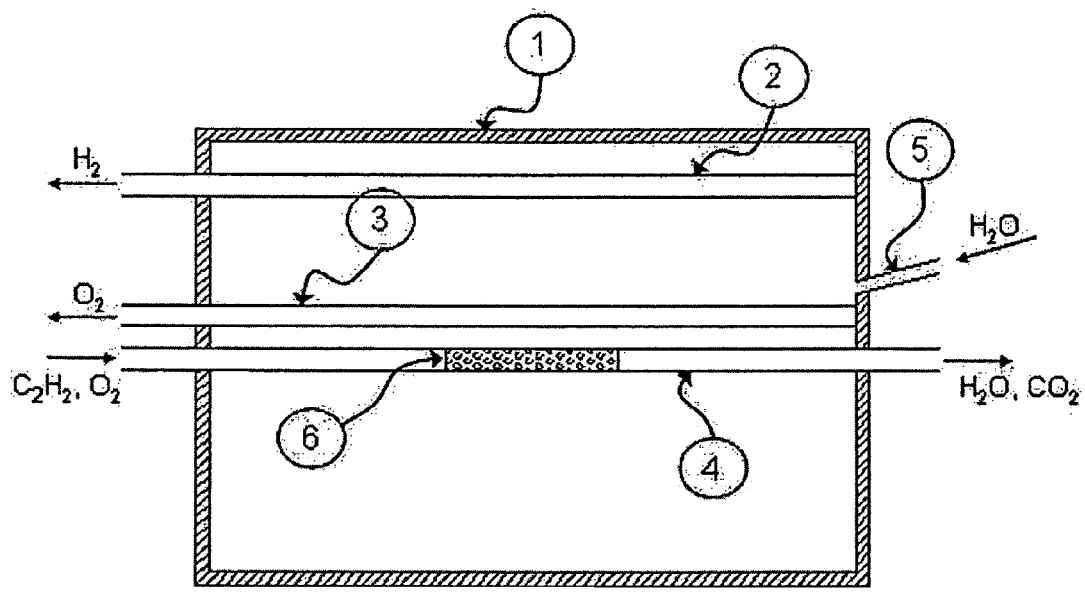
FIG. 1 is a longitudinal section view showing schematically a device according to an initial embodiment of the invention.

FIG. 1 shows a possible implementation of the device. The device comprises a closed reactor volume. In the example, the reactor chamber (1) is cylindrical. FIG. 1 shows a radial section, with all other figures showing transversal sections. Flowing through the reactor chamber, and at the same flowing through the reactor chamber and parallel to its axis of symmetry, there are three types of one or more tubes with specific functions:

1. One or more sealed tubes that are essentially gas-tight, consisting, at least partially, of a membrane device being selectively permeable for hydrogen (2, "hydrogen membrane").

2. One or more sealed tubes that are essentially gas-tight, consisting at least partially, of a membrane device being selectively permeable for oxygen (3, "oxygen membrane"), and 3. One or more sealed tubes that are essentially gas-tight (4, "heating tubes"), containing the heat source(s) (6).

The heating tubes are surrounded by the oxygen membranes. The physical separation between the water and the heat source by the heating tube makes it possible to use any type of heating. While the cylindrical symmetry selected for this implementation advocates the use of electric heating or combustion heat sources, such as porous gas burners or turbulent gas burners, the geometry may be adapted for the use of solar heating. The power of the heat source is in such a way that the water surrounding it is heated to temperatures where the water is at least partially dissociated.

A typical temperature of the heating tube is 2500 K. At such temperatures, the heat radiation transfer prevails; the natural convection heat transfer is relatively restricted, and the heat conduction transfer in the vapour is negligible.

Figure 2:
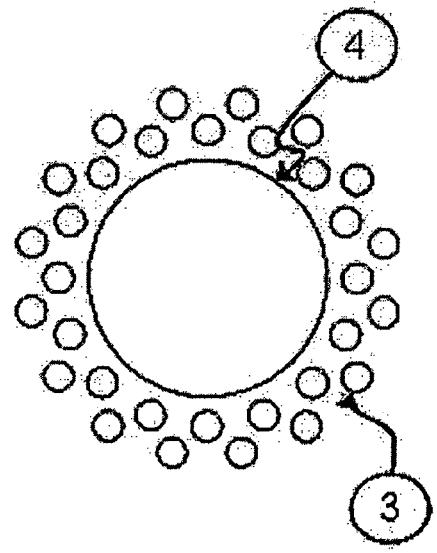
FIG. 2 is a transversal sectional view itemising the arrangement of oxygen tube membranes around a heating tube.

Each heating tube is surrounded by oxygen membranes. The oxygen-selective membrane materials, made of, for example, zirconium oxide-based ceramic, for example, have a good permeability and are resistant to the very high temperatures of the water dissociation zone. These oxygen membranes are arranged around the heat source in one or more concentric rings, an arrangement comprising two rings as shown in FIG. 2, to reflect the direct radiation coming from the heat source and shielding it. Accordingly, the temperature in the region between the heating tube and the oxygen membranes increases and the thermal gradient in this zone decreases. This simply means that the heat source can work with a lower power for equal quantities of dissociated water. The inside of the oxygen membranes is flushed out with a neutral or pump gas to remove the oxygen extracted. The oxygen membranes block a significant part of the direct radiation, but they leave room for the exchange of water and other gases, particularly hydrogen, between the dissociation zone and the zones beyond the oxygen membranes, at a distance from the heating tube.

Figure 3:
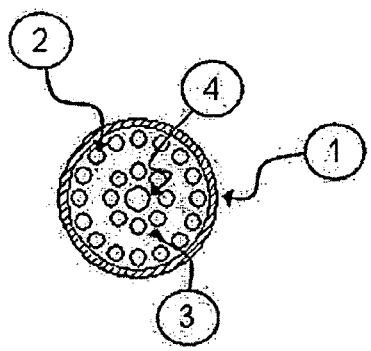
FIG. 3a is a transversal section view itemizing the arrangement of oxygen tube membranes around a heating tube and between the latter and the hydrogen tube membranes.
FIG. 3b is a longitudinal section view showing schematically oxygen membrane tubes surrounding heating tubes distributed in the reactor chamber, which are themselves surrounded by hydrogen tube membranes arranged following the inside edge of the reactor chamber.
Figure 3:
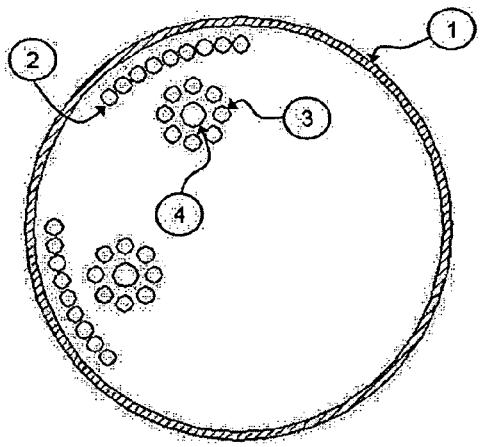

The reactor volume may contain one (FIG. 3 a) or several (FIG. 3 b) arrangements of heating tubes and oxygen membranes.

The geometry of the reactor chamber, the positioning of the components inside and the temperature of the reactor chamber walls govern how the temperature changes "outside" the oxygen membranes, i.e., at the furthest distance from the heating tube. Chilling controls the temperature of the reactor chamber walls, which is selected in such a way that the temperature distribution that is within the volume of the reactor chamber and close to its walls creates the optimal conditions of a zone of a few centimeters where the hydrogen membranes can be placed. The hydrogen membranes available today are designed for the operating temperatures of the selective materials below 1500 K. The chilling power required may be determined, for example, with a digital simulation tool. The inside of the hydrogen membranes is flushed out with a neutral or pump gas to remove the extracted hydrogen.

Figure 4A:
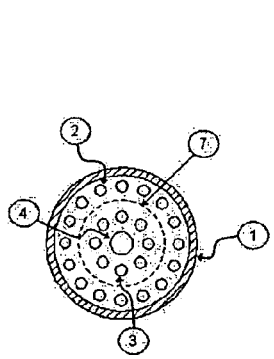
FIGS. 4a and 4b show a transversal section view of a device according to FIGS. 3a and 3b in which additional radiation shields are intercalated between the oxygen tube membranes and the hydrogen tube membranes.
Figure 4B:
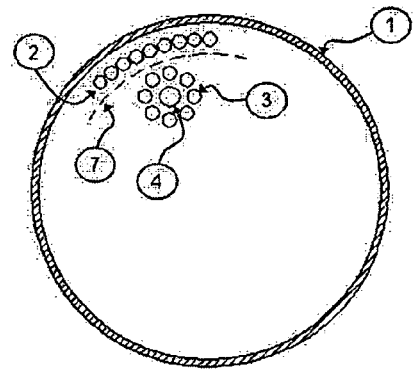

The temperature reduction, due to the two concentric oxygen membrane rings acting as a radiation shield, has been simulated for a specific geometry, and it is of the order of 300 K. To further reduce the thermal radiation transfer toward the hydrogen membranes and the reactor walls, radiation shields may also be installed in a zone between the oxygen membranes and the hydrogen membranes. The reduction of the thermal transfer allows the power required for heating and chilling, and, furthermore, allows a more compact geometry due to the thermal gradient between the oxygen membranes and the hydrogen membranes, since their distance is typically several dozen centimeters greater. However, a sufficient exchange of gas through the radiation shields must remain possible. A possible arrangement between the additional radiation shields (7) is shown in FIG. 4.

The reactor chamber contains water, and it comprises several inflows of water (5). The quantity of water initially introduced is selected in such a manner that after heating, a specific vapour pressure value is obtained, e.g., below 10 bars, in order to avoid complications and as stipulated by numerous safety regulations.

Once the oxygen has been extracted from the dissociation zone, the surplus hydrogen will be diffused throughout the reactor. The surplus hydrogen is extracted in the lower temperature zones. The hydrogen and oxygen are extracted in their stoichiometric ratio in water, i.e., in a molecular ration of 2 to 1, by controlling the flushing speed or pump power. Because the reactor chamber contains only water vapour and its dissociation products, and because the reactor volume is physically separated from the heat source, the hydrogen extracted is pure and it is not mixed with any ballast gas. In order to maintain stable working conditions, water is injected to exactly compensate the oxygen and hydrogen extracted. Thus, the quantity of gas inside the reactor is kept constant while in operation.

The inflow of water is to be provided in droplets or in cold vapour in such a manner that the water can chill the seals arranged between the functional tubes and the reactor chamber. The injection of water may also be implemented by a penetration of vapour through the porous walls of the reactor. The water or vapour injected may be preheated by using the thermal chilling discharge of the reactor walls (comprising part of the thermal insulation), with the heat from the hydrogen or oxygen extracted, as well as the heat loss from the heating system, (e.g., the exhaust gas from the burners).

Figure 5:
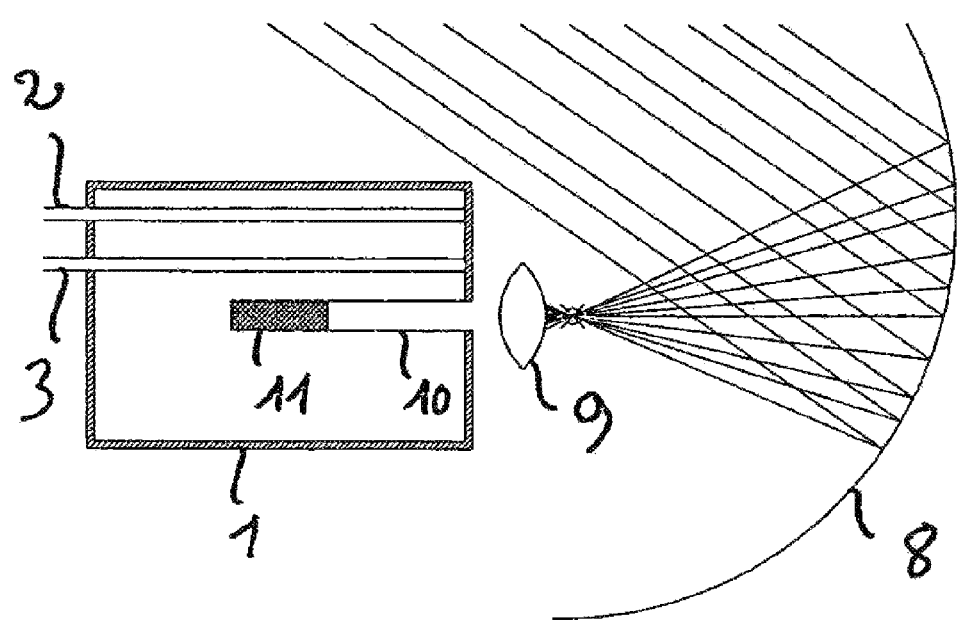
FIG. 5 is a longitudinal section view showing a device according to a second embodiment of the invention.

A specific implementation of the device may use solar radiation as a heat source. By using mirror systems 8 and lenses 9 (for a schematic diagram, see FIG. 5), it is possible to concentrate solar radiation to focus it in a tube 10 that contains a thermoreceptor 11. This receptor, e.g., a single metal block is heated, creating a heat source similar to a burner.

While in operation, the efficiency of the device is determined by the energy required to heat and dissociate the water injected as well as by the heat losses due to the chilling of the walls and to the gases extracted. The thermal efficiency of the device may be improved by using the hot vapour from the hydrogen consumer (e.g., a fuel cell or a hydrogen combustion engine) to fill up the device.

[1] Patent no. FR2839713: Creative Services and Nils Kongmark, "Dispositif pour la production des gaz purs, en particulier d'hydrogène et d'oxygène, a partir des mélanges de gaz ou des liquides, pour l'approvisionnement mobile et stationnaire d'énergie", 2003-11-21.
[2] Patent no. GB1489054: Jacques Fally, "Hydrogen Generating Device", 1977 Oct. 19.
[3] Patent no. GB1532403: Jacques Fally, "Hydrogen Generating Device", 1978 Nov. 15.
[4] U.S. Pat. No. 5,397,559: Abraham Kogan, "Method for the Separate Recovery of a High Molecular Weight Gas and a Low Molecular Weight Gas from a Gaseous Starting Mixture", 1995 Mar. 14.
[5] U.S. Pat. No. 3,901,668: Walter H. Seitzer, "Manufacture of Oxygen from High Temperature Steam", 1975 Aug. 26.
[6] U.S. Pat. No. 3,901,669: Walter H. Seitzer, "Manufacture of Oxygen from High Temperature Steam" 1975 Aug. 26.
[7] Patent no. US2004050801: Tae H. Lee, Shuangyan Wang, Stephen E. Dorris, and Uthamalingam Balachandran, "Hydrogen Production by High-Température Water Splitting Using Electron-Conducting Membranes", 2004 Mar. 18.
[8] For example: U. Balachandran, T. H. Lee, S. Wang, and S. E. Dorris, "Use of Mixed Conducting Membrane to Produce Hydrogen by Water Dissociation", Int. J. Hydrogen Energy 29 (2004) 291-296.

The invention claimed is:

1. A device for the thermal separation of water into hydrogen and oxygen, comprising a closed reaction chamber containing water and in said reaction chamber:
    a heating system comprising a heat source element, said heat source element being a thermoreceptor for receiving concentrated solar radiation;
    one or more membranes, essentially gas-tight, being selectively permeable for oxygen;
    one or more membranes, essentially gas-tight, being selectively permeable for hydrogen; and
    a mechanism for inducing water into the said reactor reaction chamber, characterized in that
    the said heat source element are located in the water inside the said reaction chamber;
    the temperature distribution in the reaction chamber is predetermined and comprises:
    zones where the temperature is high enough such that the water in these zones is at least partially dissociated and that these zones are large enough to contain the said membranes being selective for oxygen;
    lower temperature zones which are large enough to contain the said membranes being selective for hydrogen, wherein the said lower temperatures correspond to the operating conditions of the membrane materials,
    and wherein said temperature distribution is obtained and controlled by the heating power, by a cooling of the walls of the reaction chamber, by the positioning of the membranes and by the distance(s) between the heat source element and the walls of the reaction chamber,
    and wherein the said membranes being selective for oxygen are located in the said high temperature zones,
    and wherein the said membranes being selective for hydrogen are located in the said low temperature zones.

2. A device according to claim 1, characterized in that the said oxygen-selective membranes are arranged around the said heat source element, in such a manner that they reduce the heat flux from the heat source element toward the zones beyond the high temperatures and form a shield protecting the other components from the direct thermal radiation coming from the said heat source element.

3. A device according to claim 1, characterized in that one or more layers of radiation shields are arranged in the zone formed between the said high temperatures and the zone formed by the said lower temperatures in such a way that the heat flux is reduced and the thermal gradient is increased, allowing the hydrogen to seep through.

4. A device according to claim 1, characterized in that the heating system comprises one or more porous gas burners.

5. A device according to claim 1, characterized in that the heating system consists of one or more turbulent porous gas burners.

6. A device according to claim 1, characterized in that the device further comprises one or more solar radiation concentrators focusing the rays on the thermoreceptor inside the reaction chamber.

7. A device according to claim 1, characterized in that the temperature pressure and distribution are kept stable by adjusting the power of the said heat source element, the quantity of water injected into the reaction chamber and the cooling of the walls of the latter.

8. A device according to claim 1, characterized in that the walls of the reaction chamber, the said oxygen-selective membranes, the said hydrogen-selective membranes, the two said membranes or any other component in the reactor reaction chamber may contain one or more reactants or catalysers, facilitating the dissociation of water into hydrogen and oxygen in the lower temperature zones.

9. A device according to claim 1, characterized in that the influx of water is used to cool the thermosensitive components of the reaction chamber.

10. A device according to claim 1, characterized in that in the joint operation with a hydrogen consumer, the water produced by the said consumer is recycled into the device in order to optimise its energy efficiency.

* * * * *